US008454260B2

(12) United States Patent  
Wilcoxson

(10) Patent No.: US 8,454,260 B2
(45) Date of Patent: Jun. 4, 2013

(54) WEIGHT SELECTING POP-PIN

(76) Inventor: Ken Wilcoxson, Napa, CA (US)

( * ) Notice: Subject to any disclaimer, the term of this patent is extended or adjusted under 35 U.S.C. 154(b) by 676 days.

(21) Appl. No.: 12/582,568

(22) Filed: Oct. 20, 2009

(65) Prior Publication Data

US 2011/0091272 A1    Apr. 21, 2011

(51) Int. Cl.
    F16B 21/09    (2006.01)
(52) U.S. Cl.
    USPC ............................. 403/315; 403/318; 403/324
(58) Field of Classification Search
    USPC ........... 482/97–99; 403/315–319, 321–322.2, 403/324–328
    See application file for complete search history.

(56) References Cited

U.S. PATENT DOCUMENTS 5,306,221 A * 4/1994 Itaru ............................ 482/98
5,556,362 A * 9/1996 Whipps ........................ 482/98
7,473,211 B2 * 1/2009 Lee .............................. 482/97
7,485,076 B2 * 2/2009 Lee .............................. 482/99
7,507,189 B2 * 3/2009 Krull ........................... 482/98
7,540,832 B2 * 6/2009 Krull ........................... 482/98

* cited by examiner

Primary Examiner — Victor MacArthur
(74) Attorney, Agent, or Firm — Kilpatrick Townsend & Stockton LLP

(57) ABSTRACT

A pop-pin and a method for using the pop-pin with a weight-training machine to perform mixed-weight sets of exercise are disclosed. A pop-pin having a spring loaded into an unstable equilibrium position can be inserted into a weight stack to select a weight and vertical guide bar while another conventional pin is inserted into the same weight stack and the vertical guide bar at a position above the pop-pin. A user can then operate the weight-training machine, at which point the spring on the pop-pin is dislodged from the unstable equilibrium position and presses on the weight plate into which it is inserted. When the weight stack is lowered, thus reducing the load of weight on the pop-pin, the force of the spring pressing against the weight plate ejects the pop-pin from the weight plate. At this point, the user can continue the exercise with the smaller stack.

8 Claims, 8 Drawing Sheets

WEIGHT SELECTING POP-PIN

BACKGROUND OF THE INVENTION

The present invention is directed towards a device and related methods for use with various styles of weight-training machines. Weight-training machines have enjoyed increased popularity with users over the years for a number of reasons. In addition to providing a convenient and safe method of changing resistance, weight-training machines also provide a structured, relatively safe and informative approach to weight training for individuals seeking a self-guided workout.

A conventional weight-training machine uses gravity as the primary source of resistance, and a combination of so-called "simple machines" to convey that resistance to the person using the machine. Each of the machines (pullies, levers, wheels, inclines) changes the mechanical advantage of the overall machine relative to the weight and allows a user to take advantage of the gravitational resistance while performing exercises in many directions.

Most styles of weight machines have a set of massive weight plates configured with a least one hole through each of the plates. Each plate is disposed in a stack with at least one vertical guide bar disposed through the holes. The vertical guide bar is configured to be raised and lowered via a combination of simple machines configured to translate the motion of an exercise into an up and down motion. By selectively attaching a number of plates to the vertical guide bar, the resistance of the exercise can be changed according to the preference of the user.

To provide for quick and easy changes in the number of weights attached to the vertical guide bar, both the vertical guide bar and the plates have holes drilled into them to accept a pin. A pin is inserted into the hole in a plate and a corresponding hole in the vertical guide bar. When the vertical guide bar is lifted, the plate into which the pin is inserted, and all the plates located above it in the stack, rest on the pin and are thus also lifted. The plates below the pin do not rise. This allows the same machine to provide several levels of resistance over the same range of motion with an adjustment that requires very little effort to accomplish in itself.

The means of lifting the bar vary. Some machines have a roller at the top of the bar that sits on a lever. When the lever is raised, the bar can go up and the roller moves along the lever, allowing the bar to stay vertical. On some machines, the bar is attached to a hinge on the lever, which causes swaying in the bar and the plates as the lever goes up and down. On other machines, the bar is attached to a cable or belt, which runs through pulleys or over a wheel. The other end of the cable will either be a handle, bar or strap that the user holds or wraps around some body part, or will be attached to a lever, adding further simple machines to the mechanical chain.

Usually, each plate is marked with a number. On some machines, these numbers give the actual weight of the plate and those above it and on others machines, the number gives the force at the user's actuation point with the machine. Finally, on some machines the number is simply an index counting the number of plates being lifted.

There are numerous types of training machines that are designed to assist users in performing various types of weight-training exercises. For example, there are benchpress machines, bicep curl machines, leg press machines, etc. Additionally, there are various techniques and methodologies for using each of the various weight-training machines. For instance, many users tend to do multiple "sets" of some number of repetitions or "reps." For example, a user may perform 3 sets of 10 repetitions of a benchpress exercise using a particular weight as part of his or her workout. This can be achieved by inserting the pin into the plate indicating the desired amount of weight. However, some users prefer to do sets of repetitions where each set includes a number of repetitions at a first heavier weight and then a second number of repetitions at a second weight. This is sometimes referred to as "mixed-weight set training" or "reverse pyramid training."

To perform a set of an exercise with two different weight settings, or a mixed-weight set, on a conventional weight-training machine requires the user to stop during his or her set to change the location of the pin in the weight stack. Stopping not only requires more time to complete the exercise, it also lessens the effectiveness of the mixed-weight set exercise. To solve this problem, some manufacturers of weight-training machines have devised complicated and expensive devices to change the weight stack at some point during a set.

One method of changing the weight stack involves setting two or more pins in the weight stack and setting a timer that controls a mechanical device that can eject the lower of the two pins to release a lower portion of the stack of weights to reduce the weight lifted. This method of course requires not only a timer, but also the mechanism to remove the pin when the timer goes off. Such mechanisms are costly and must either be fitted to the weight-training machine at the time of manufacture or included in a complicated retrofit system. Additionally, the timer aspect forces the user to complete the first phase of a mixed-weight set in predetermined amount of time, often causing the weight to be lowered sooner or later than the user would like. Such solutions for performing mixed weight exercises on a weight-training machine are not feasible for weight-training machines that are already deployed at fitness clubs or in home gyms.

As such, there is a need for a simple, easily-adaptable and inexpensive device to allow users and/or owners of existing weight-training machines quick performance of mixed-weight weight-training exercises.

BRIEF SUMMARY OF THE INVENTION

Embodiments of the present invention are directed to a pop-pin, having a shaft with an exterior surface, a first end and a second end. The pop-pin can also include a trigger catch extending perpendicularly to the exterior surface of the shaft, a retention catch extending perpendicularly to the exterior surface of the shaft and disposed between the trigger catch and the first end of the shaft. A handle can be disposed onto the second end of the shaft and a coil compression spring can be disposed around the shaft and dimensioned for capture between the handle and the retention catch. The trigger catch extends sufficiently from the exterior surface of the shaft to maintain the spring in an unstable equilibrium position when the coil compression spring is biased against the handle. The retention catch extends sufficiently from the exterior surface of the shaft to retain the coil compression spring between the handle and the retention catch.

DETAILED DESCRIPTION OF THE INVENTION

The present invention is directed towards a weight selecting pop-pin device and methods to use the same in a pin selected weight-training device.

Weight Selecting Pop-pins

Figure 1:
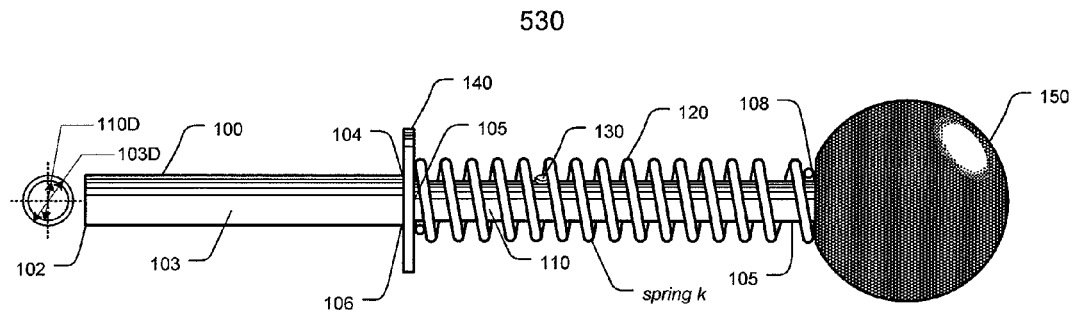
FIG. 1 is an illustration of a pop-pin according to one embodiment of the present invention.

FIG. 1 shows an assembled pop-pin 530 according to various embodiments of the present invention. FIG. 1 shows the pop-pin can include a shaft 100 that includes first end 102 and a second end 108. In some embodiments, shaft 100 can include a first shaft 103 and a second shaft 110 attached to one another. First shaft 103 can include first end 102 and second shaft 110 can include second end 108. Accordingly, first shaft 103 can include a third end 104 that abuts a fourth end 105 of second shaft 110 when first shaft 103 and second shaft 110 are connected to form shaft 100. The junction of third end 104 and fourth end 105 can define a joint having a shoulder 106.

When connected, the interface of third end 104 and fourth end 105 can define a joint or connection having a shoulder 106. Shoulder 106 can have a dimension defined by the difference between the diameters of the first shaft 103 and second shaft 110. In FIG. 1, the dimension of shoulder 106 is the difference between diameters 103D and 110D, where diameter 103D is the diameter of first shaft 103 and diameter 110D is the diameter of second shaft 110.

A spring 120 can be dimensioned to fit around the second shaft 110 and be captured by shoulder 106 and handle 150. In use, washer 140 can be used to compress spring 120 against handle 150 until washer 140 engages trigger catch point 130. Trigger catch point 130 can be dimensioned and shaped to hold washer 140 in an unstable equilibrium position between trigger catch point 130 and compressed spring 120.

The unstable equilibrium can be disturbed by applying a shock or other vibration to the pop-pin 530. When the unstable equilibrium is disturbed, washer 140 can be released from catch point 130 and biased against the end of shoulder 106 or some other object into which the pop-pin 530 can be inserted. For example, the pop-pin 530 can be set to the unstable equilibrium point at catch point 130 and inserted into the channel 560 of a weight plate 60 and a corresponding channel 515A in a vertical guide bar 510 of a weight-training machine shown in FIGS. 5a and 5b. Use of the pop-pin 530 will be discussed in more detail below.

Figure 4A:
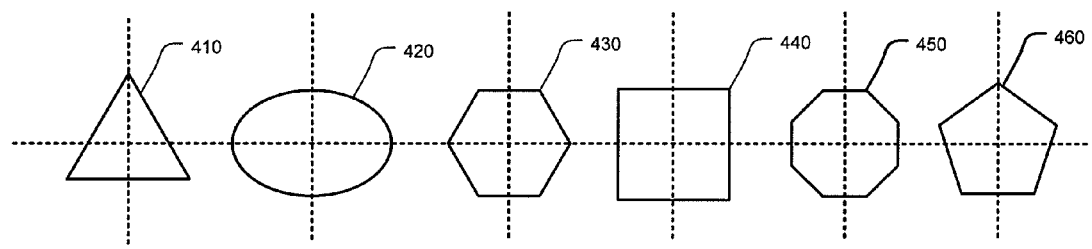
FIG. 4a shows cross sections of the shaft of the pop-pin in FIG. 1 according to various embodiments.

The first shaft 103 can be any shape or size compatible with a desired weight plate or weight-plate stack. For example, most weight-training machines have round holes with cylindrical channels in the weight plates and the vertical bar. In such cases, it would be beneficial for the first shaft 103 to be an appropriately sized cylinder so that first end 102 of the first shaft 103 can be easily inserted into the channels of the weight plates and the vertical bar. In other embodiments, the diameter of the first shaft 103 can be smaller than the diameter of the channel in the weight plates and the vertical bar to allow for a loose fit. In some embodiments, the diameter 103D of the first cylindrical shaft can be approximately 9 mm. The first shaft 103 and the second shaft 110 can be solid or hollow. In other embodiments, the first shaft 103 and second shaft 110 can be of any shape of solid or hollow prisms compatible with the channels in the weight plates and the vertical bar with which pop-pin 530 is intended to be used. For example, the first shaft 103 and second shaft 110 can be rectangular, oval, triangular or any other shape prism. Examples of possible cross-sectional shaft shapes are shown in FIG. 4a. As shown, the shafts of pop-pin 530 can have triangular cross-section 410, oval cross-section 420, hexagonal cross-section 430, rectangular 440, octagonal cross-section 450, pentagonal cross-section 560 or any other suitable cross-section.

The first shaft 103 and second shaft 110 can be made of any material suitable for supporting the weight in a stack of weight plates in a weight-training machine. For example the first shaft 103 and the second shaft 110 can be metal, ceramic, fiber reinforced plastics or resins or any other appropriate material suitable for weight-bearing needs of the shaft. First shaft 103 and second shaft 110 can comprise any number of materials.

Spring 120 can be a compression spring with a sufficient spring stiffness coefficient, k, sufficient to exert some force, $F_A$, when compressed from its retention position, or retention catch point, adjacent to third end 104 of first shaft 103 to the unstable equilibrium position at trigger catch point 130. This distance of spring compression can be described as $\Delta$, where $\Delta$ is defined as the distance between position $X_1$ and $X_2$, such that the force can be approximated, at least to the first order, as, $F_A = -k\Delta$. Since $F_A$ varies linearly with $\Delta$ and k, either the distance between the trigger catch point and retention catch point or the spring constant k can be varied to produce sufficient force to eject pop-pin 530 from a channel into which it is inserted when spring 120 is released from an unstable equilibrium point at catch point 130. Spring 120 can be any suitable compression spring including, but not limited to, a coil compression spring or compressible rubber or polymer material with a similar stiffness spring constant or resistive compression characteristic.

Trigger catch point 130 can be any suitable extension extending from the shaft 100, first shaft 103 or second shaft 110. In some embodiments, trigger catch point 130 can be a screw. For example, the screw can be threaded into an appropriately threaded hole so that it extends from the exterior surface of shaft 100. In other embodiments, trigger catch point 130 can be a peg soldered or welded onto or into the second shaft 100. In alternative embodiments, trigger catch point 130 may be machined from the same piece of material from which shaft 100, first shaft 103 or second shaft 110 are formed.

Washer 140 can be a standard washer configured with a central channel, extending from an aperture on a first side of the washer 140 to an aperture on a second side of the washer, of sufficient size to allow for washer 140 to move along shaft 100 or second shaft 110, yet be able to be set into an unstable equilibrium position at trigger catch point 130. Washer 140 can be made from metal, plastic, resin, fiber reinforced plastic or resin or any other material suitable for sliding along shaft 100 or second shaft 110 and catching on trigger catch point 130 and having sufficient strength when held against spring 120 and catch point 130 without breaking, bending, cracking or otherwise failing. Washer 140 can be a standardized or off-the-shelf washer. Use of an off-the-shelf washer can help increase the cost effectiveness of manufacturing the pop-pin.

Figure 4B:
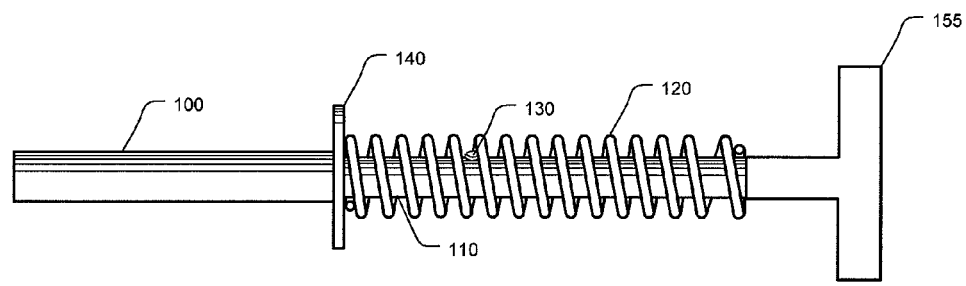
FIG. 4b depicts a pop-pin of FIG. 1 with a t-shaped handle.
Figure 4C:
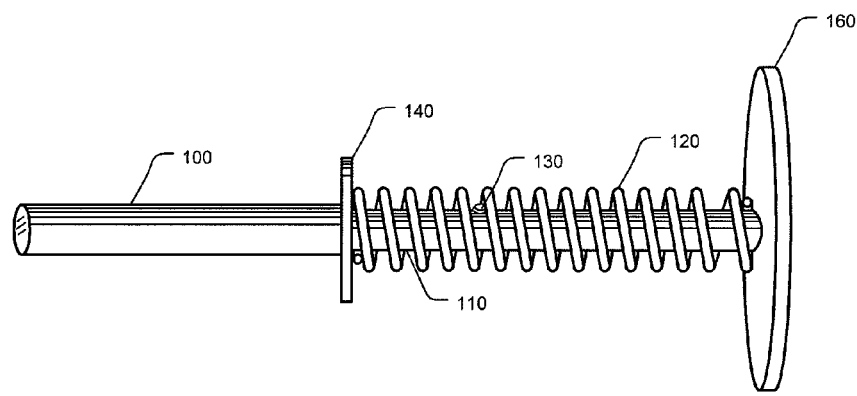
FIG. 4c depicts a pop-pin of FIG. 1 with a disc-shaped handle.

Handle 150 can be attached to second shaft 110 at second end 108 and can be any suitable shape conducive to being easily handled manually and capturing retaining spring 120. The size shape and material of the handle 150 can be modified to suit the particular design aesthetic or look desired for the pop-pin. For example, handle 150 can be a sphere, spheroid, a T-handle, or a disk or other flat handle. FIGS. 4b and 4c show variations of handle 150 according to various embodiments of the present invention. For example, FIG. 4b shows the pop-pin with a T-handle 155 and FIG. 4c shows the pop-pin with a disk handle 160.

Figure 2A:
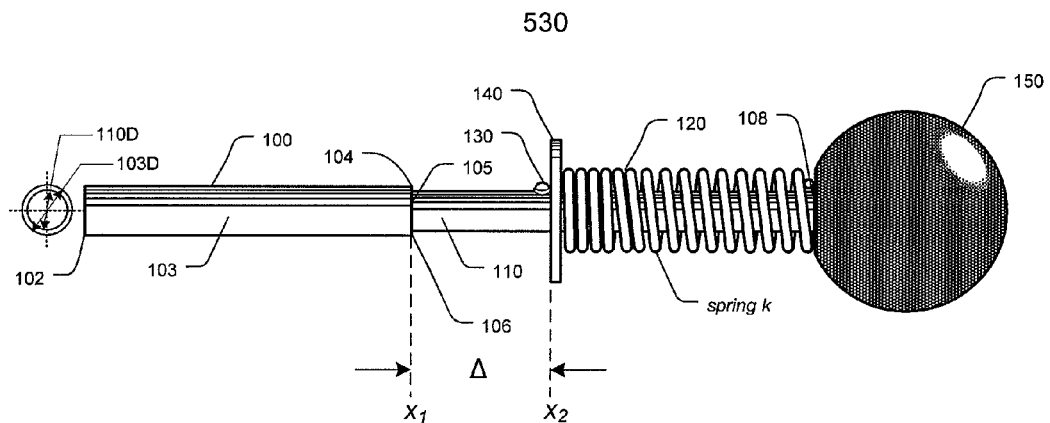
FIG. 2a shows the pop-pin of FIG. 1 held in an unstable equilibrium.
Figure 2B:
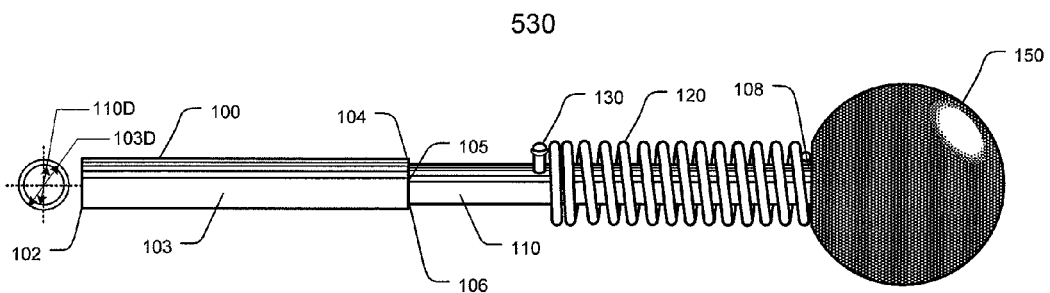
FIG. 2b shows the pop-pin of FIG. 1 held in an unstable equilibrium.

FIG. 2a depicts the pop-pin of FIG. 1 with spring 120 biased against handle 150 by pressing washer 140 until it is engaged with trigger catch point 130. The configuration of the pop-pin depicted in FIG. 2a represents an unstable equilibrium position in which washer 140 can be easily dislodged from trigger catch point 130 by a sufficient shock to the pop-pin. In some embodiments, the shock to the pop-pin can be provided by lifting up a vertical bar in which the pop-pin 530 has been inserted to engage one or more weight plates on a weight-training machine FIG. 2b depicts another variation of the pop-pin in which washer 140 is removed and the end of spring 120 is used to engage the trigger catch point 130. Such embodiments can further reduce the cost of manufacturing and assembling the pop-pin 530 by reducing the number of parts. Furthermore, depending on the relative difference in diameter between the second shaft 110 and spring 120, the height of trigger catch point 130 relative to the exterior surface of shaft 110 can be extended or reduced to compensate for the lack of washer 140.

Figure 3A:
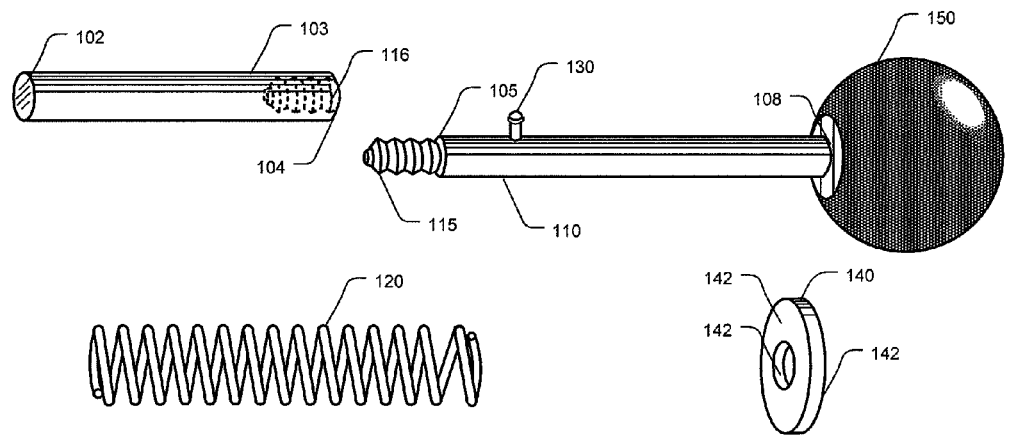
FIG. 3a is an exploded drawing of the pop-pin of FIG. 1.
Figure 3B:
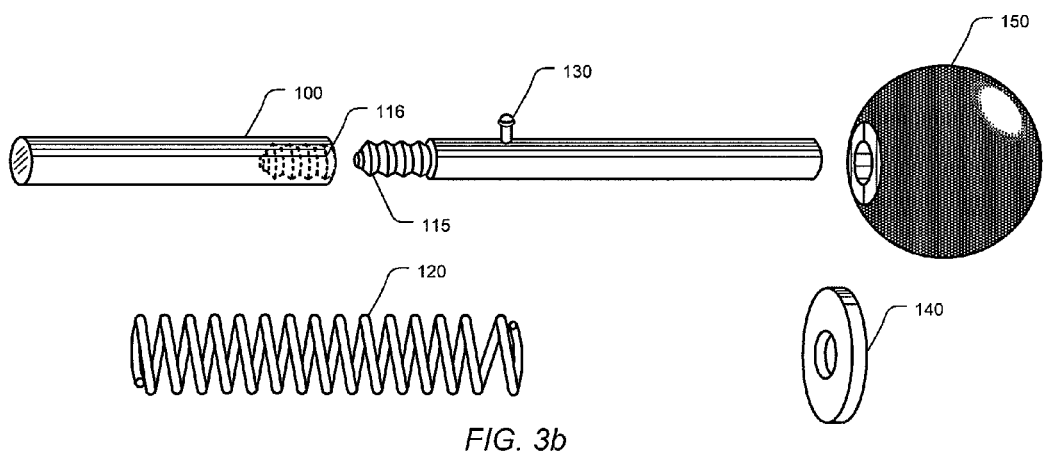
FIG. 3b is an exploded drawing of the pop-pin of FIG. 1.
Figure 3C:
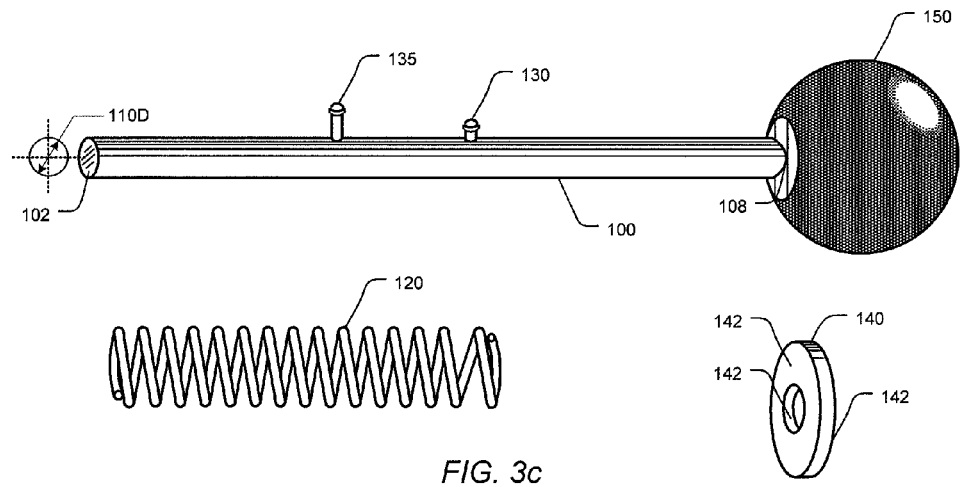
FIG. 3c is an exploded drawing of the pop-pin of FIG. 1.

FIGS. 3a to 3c show various exploded views of pop-pins according to various embodiments of the present invention. As shown in FIG. 3a and FIG. 3c, first shaft 103, which can have first end 102 and third end 104, and the second shaft 110, which can have second end 105 and fourth end 108, can be coupled using external threads 115 on second end 105 threaded into a corresponding internal threads 116 in third end 104. In other embodiments not shown, external threads 115 can be on third end 104 on first shaft 103 and the corresponding internal threads 116 can be in second end 105 of second shaft 110. In addition to connecting first shaft 103 to second shaft 110 by threaded engagement, the shafts can also be connected by other types of engagement such as friction fit, snap fit, welded junction, etc.

Handle 150 and second shaft 110 with threads 115 can be formed of the same piece of material. In such embodiments, the handle 150, second shaft 110 with threads 115 can be milled, cast or injection molded. FIG. 3b illustrates an unassembled pop-pin in which the first shaft 103, second shaft 110 with threads 115 and handle 150 are all separately manufactured parts. In such embodiments second shaft 110 can be inserted or otherwise fixed to handle 150. To fix the second shaft 110 to handle 150, second shaft 110 can be glued, friction fit or threaded into handle 150. In other embodiments handle 150 can be drilled and threaded to accept a setscrew or rivet to engage with the second shaft 110 once it is inserted into the handle 150.

FIG. 3c shows pop-pin 530 in which the pop-pin includes a single shaft 100 instead of the first shaft 103 and second shaft 110. In such embodiments, in which shaft 100 is a constant diameter, a retention catch point 135 is added so as to capture spring 120 between retention catch point 135 and handle 150. Retention catch point 135 can be dimensioned so that spring 120 cannot escape shaft 100. Such embodiments can further reduce the cost and complexity of manufacturing and assembling the pop-pin by reducing the bill of materials required for a single pop-pin.

Figure 5A:
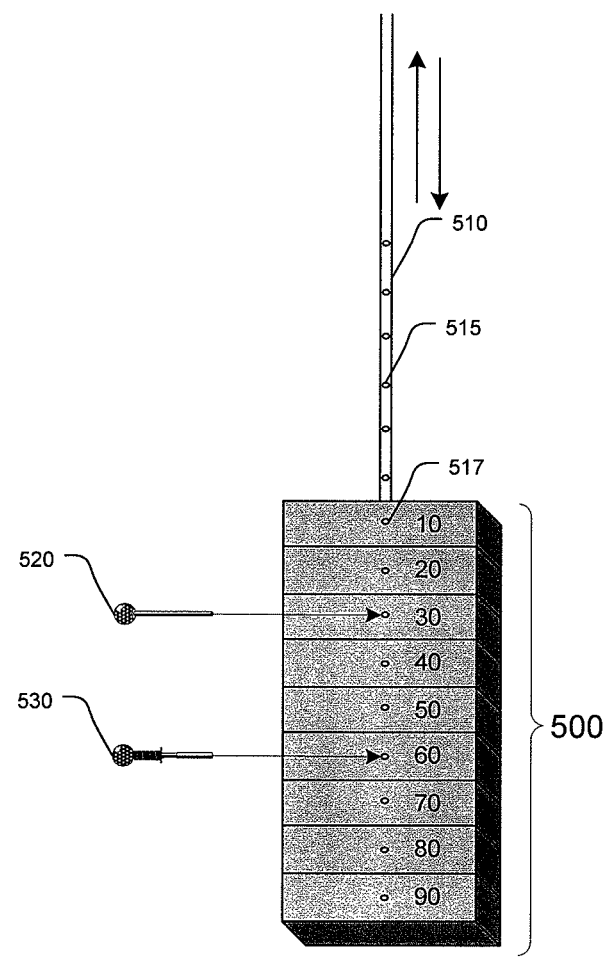
FIGS. 5a-5d depicts a weight stack in a conventional weight-training machine as used with the pop-pin of FIG. 1.

FIGS. 5a to 5d illustrate how pop-pin 530 is used in conjunction with a pin 520 and a weight-training machine having a weight plate stack 500 and a vertical bar 510. FIG. 5a depicts a stack of weight plates 500 found in many typical weight-training machines. As shown, stack of weight plates 500 includes a plurality of weight plates each having a hole in the front face with an interior channel, such as channel 517, that extends either partially or completely through each weight plate. Furthermore, vertical guide bar 510 can also have a plurality of channels 515 configured to run perpendicularly to the surface of the vertical guide bar 510 and extend either partially or entirely through the vertical guide bar 510. Each channel in each weight plate in stack 500 can be configured to accept a pin used to select the amount of weight to be lifted by vertical bar 510. In some embodiments, channels 515 in vertical guide bar 510 can align with the channels 517 in the weight plates in the stack 500 so that pin 520 or 530 can be readily inserted into a channel of a weight plate in stack 500 and engage a channel 515 in vertical guide bar 510.

Figure 5B:
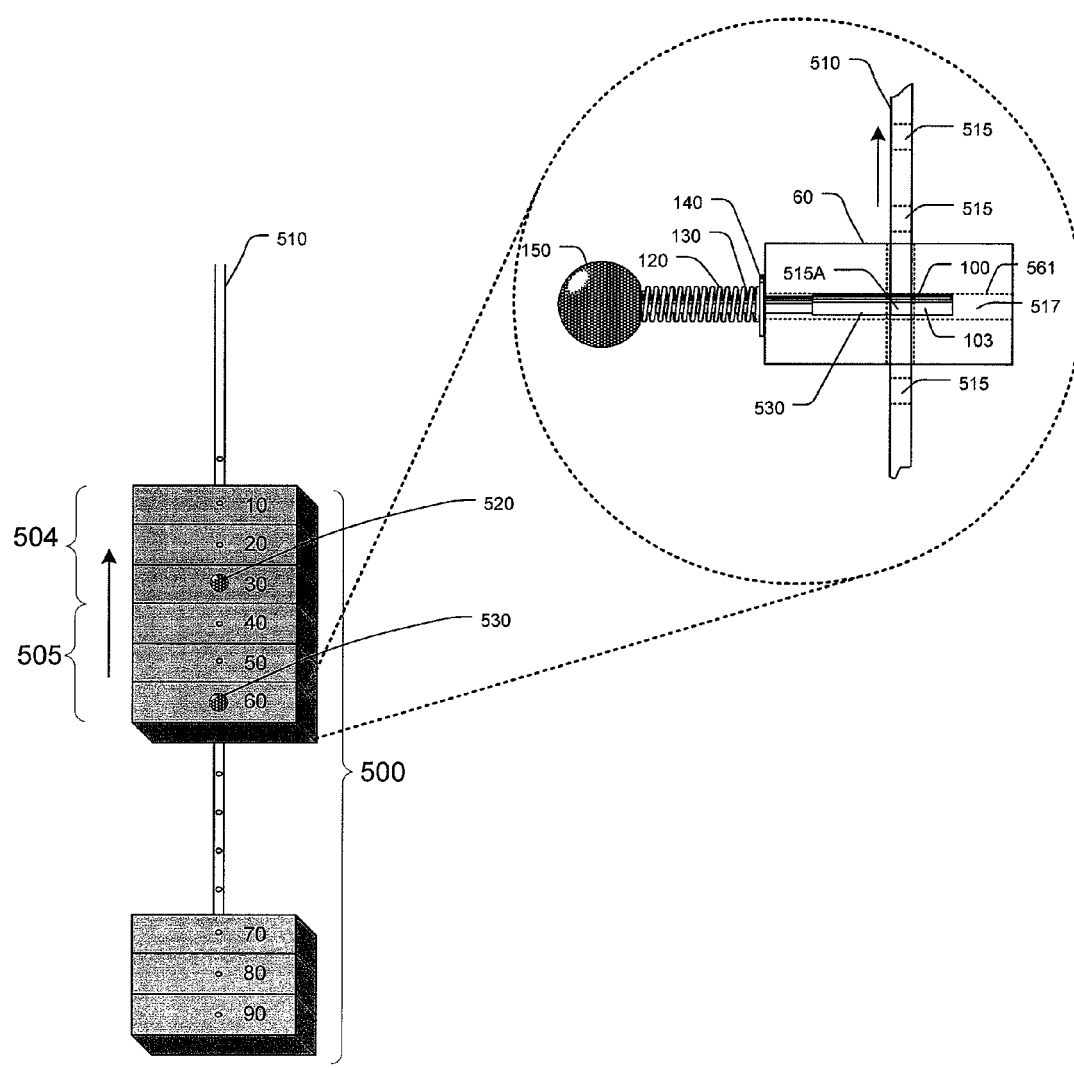

FIG. 5b illustrates pop-pin 530 inserted into weight plate 60 and pin 520 inserted into weight plate 30. Before being inserted into weight plate 60, the spring 120 and possibly washer 140 of pop-pin 130 can be manually compressed and arranged to catch on trigger catch point 130 in an unstable equilibrium position. When spring 120 is arranged in an unstable equilibrium position, pop-pin 530 can be referred to as being "loaded" or "cocked."

With loaded pop-pin 530 inserted into the channel 517 of weight plate 60 and the corresponding channel 515 of vertical guide bar 510, stacks 504 in 505 are ready to be lifted. As such, when bar 510 is raised all weight plates above weight plate 60, i.e. stacks 504 and 505, in stack 500 are also raised. For example, vertical guide bar 510 can be raised and lowered by a system of pulleys and cables by a user performing a bench press exercise. The action of engaging weight plates 60 with vertical guide bar 510 via pop-pin 530 can disturb the pop-pin 530 such that spring 120 is knocked out of its unstable equilibrium position at trigger catch point 130. Thus released, spring 120 is biased against the handle 150 and the front surface of plate 60. In the absence of any intervening force or latch, pop-pin 530 would be ejected from the channels 515 and 517 by the force exerted on handle 150 by spring 120 biased against the front of weight plate 60.

In embodiments of the present invention, the shock to the pop-pin of engaging and lifting the stacks 505 and 504 of weight plates disturbs the unstable equilibrium and causes washer 140 to overcome the trigger catch point 130 and be biased against the exterior surface of the particular weight plate into which the pop-pin is inserted. The force of the stack of weight plates pressing down on the pop-pin causes the pop-pin to press against the interior surface of the channels 517 and 515 in the weight plate and vertical guide bar into which the pop-pin is inserted. As shown in the cross-sectional view in FIG. 5b, the static friction between the pop-pin 530 and the interior of the channels 517 and 515A is sufficient to overcome the force of the spring 120 biased against washer 140 and the exterior surface of the weight plate 60 into which the pop-pin is inserted and handle 150 to hold the pop-pin 530 in place while a user performs an exercise using the weight-training machine. The k coefficient of the spring can be chosen such that the least amount of weight selectable with the pop-pin can create sufficient friction to prevent the pop-pin from ejecting from the channels as long as some number of the plates in weight-stack 500 is engaged with the vertical guide bar 510 via the pop-pin 530.

After some number of repetitions of raising and lowering stacks 504 and 505, vertical guide bar 510 can be lowered to a resting position such that pop-pin 530 is no longer bearing the weight of stacks 504 and 505 and the static friction between pop-pin 530 and the channels 517 of weight plates 60 and 515A of vertical guide bar 510 is reduced to the point that the force exerted by compressed spring 120 on handle 150 is enough to eject pop-pin 530 from the channels 517 and 515A.

Figure 5C:
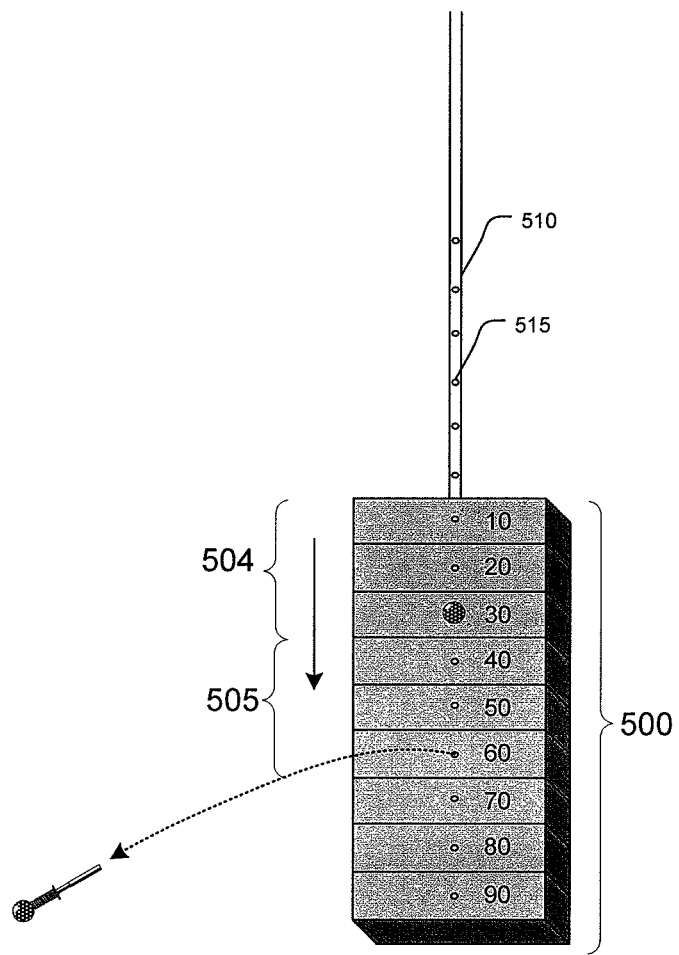
Figure 5D:
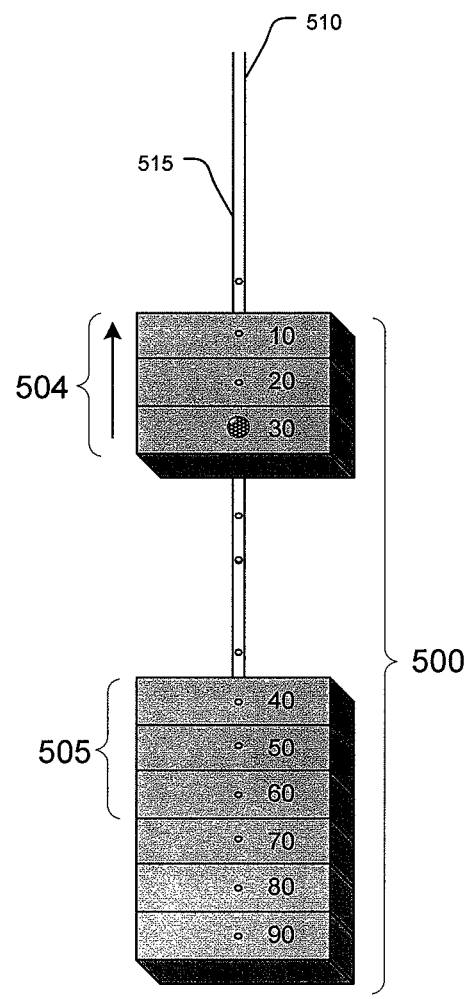

In some embodiments, the user may only have to tap lightly stacks 504 and 505 against the top surface of weight plate 70 to achieve a brief moment in a resting position for pop-pin 530 to be ejected. Since all it takes is for stacks 504 of 505 to touch the top surface of weight plates 70 to eject pop-pin 530, a user can decide to reduce the number of weight plates he or she is lifting while in the midst of performing an exercise. For example, a user performing a bench press may wish to perform 10 repetitions with the weight stack set to lift weight plates 60 and the weight plates above it in stack 500, i.e. stacks 504 in 505, and then perform 10 repetitions with the weight stack set to lift only stack 504. To reduce the weight of combined stacks 505 and 504 to only the weight of stack 504, a user can simply return the weight stack comprising stacks 504 in 505 to a resting position, at which point pop-pin 530 will automatically be ejected, as shown in FIG. 5c, and the user can continue the second set of 10 repetitions using only stack 504, as shown in FIG. 5d, without interruption or the need to manually change the position of a weight selecting pin.

Figure 6:
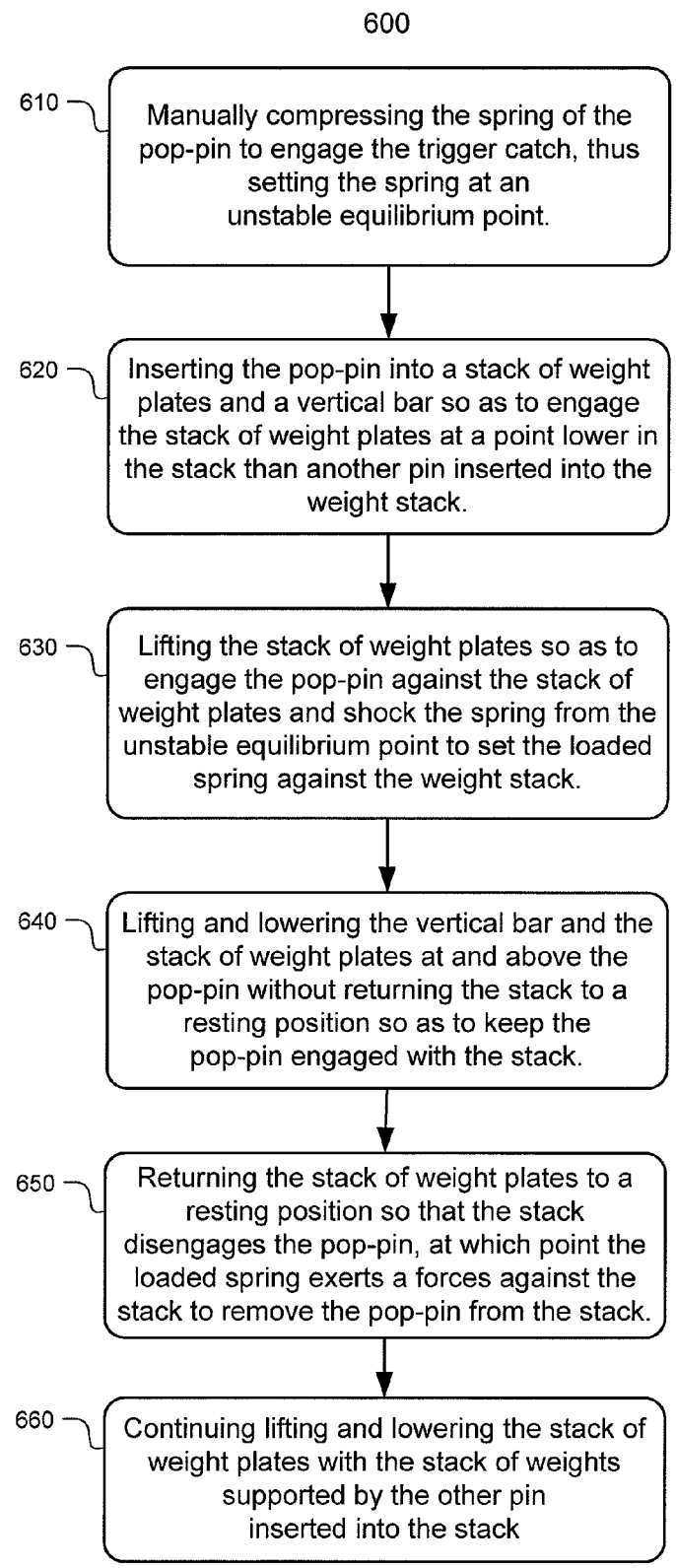
FIG. 6 is a flowchart of a method of using the pop-pin of FIG. 1.

FIG. 6 is a flowchart of a method 600 for using pop-pin 530 with a weight-training machine that can include a stack of weight plates disposed around a vertical bar used to lift one or more of the weight plates. At step 610, the user can manually compress spring 120 to engage the end of spring 120 or washer 140 with trigger catch point 130 to position spring 120 into an unstable equilibrium. This step can be completed manually, however this step can also be accomplished with the use of a customized spring loading mechanism whereby a user can insert the pop-pin into a channel using his or her body weight or mechanical lever to set spring 120 into an unstable equilibrium position.

At step 620 the user can insert the loaded pop-pin 530 into the a stack of weight plates and a vertical guide bar so as to engage the stack of weight plates at a point lower in the stack than another conventional pin inserted into the weight stack. This step creates a combined stack of two stacks with the combined stack including all the weight plates above the loaded pop-pin which includes a second lighter stack including all the weight plates above the weight plate into which the conventional pin is inserted.

When the user lifts the stack of weight plates so as to engage the pop-pin with the stack of weight plates, the shock to the spring causes the spring and/or the washer to be disturbed from the unstable equilibrium position on the trigger catch point. The spring is then biased against the weight plate in step 630. The initial jerk of the vertical guide bar can be sufficient to shock the loaded spring on the pop-pin out of its unstable equilibrium point. The user can then lift and lower the vertical guide bar and the combined stack of weight plates making sure not to return the stack to a resting position so at to keep the pop-pin engaged with the stack of weight plates at step 640. When the user is ready to reduce the weight of the stack of weight plates to that of only the weight plates engaged by the conventional pin, the user need only return the combined stack of weights to a resting position in step 650. By resting the weight stack located above the pop-pin on the weight stack below the pop-pin, the friction between the pop-pin and the interior of the channels in the weight plate and the vertical guide bar into which the pop-pin is inserted is reduced to the point that the force exerted by the spring can overcome the friction so as to eject the pop-pin from the weight stack.

Once the pop-pin has been ejected from the stack, the vertical guide bar can engage only the weight plates in the stack above the weight plate into which the conventional pin is inserted. At this point, the user can immediately continue lifting and lowering the lighter stack of weight plates supported by the conventional pin at step 660.

One or more features from any embodiment may be combined with one or more features of any other embodiment without departing from the scope of the invention.

A recitation of "a", "an" or "the" is intended to mean "one or more" unless specifically indicated to the contrary.

As will be understood by those skilled in the art, the present invention may be embodied in other specific forms without departing from the essential characteristics thereof. For example, the pop-pin may include any combination of shaft sizes, shapes or handle configurations suitable for insertion into and supporting the weight of a weight stack. Many other embodiments are possible without deviating from the spirit and scope of the invention. These other embodiments are intended to be included within the scope of the present invention, which is set forth in the following claims.

What is claimed is:

1. A pop-pin, comprising: a shaft comprising an exterior surface; a first end; a second end; and a first cylinder having a first diameter; a second cylinder having a second diameter smaller than the first diameter of the first cylinder and comprising the second end and a third end; wherein the first cylinder comprises the first end and a fourth end; and wherein the third end of the second cylinder is attached to the fourth end of the first cylinder; and wherein the fourth end of the first cylinder comprises internal screw threads, and wherein the third end of the second cylinder comprises external screw threads and the first cylinder and the second cylinder are configured for threaded engagement; a trigger catch extending perpendicularly to the exterior surface of the shaft; a retention catch extending perpendicularly to the exterior surface of the shaft and disposed between the trigger catch and the first end of the shaft; a handle disposed on the second end of the shaft; and a coil compression spring disposed around the shaft and dimensioned for capture between the handle and the retention catch; wherein the trigger catch extends sufficiently from the exterior surface of the shaft to maintain the spring in an unstable equilibrium position when the coil compression spring is biased against the handle, and wherein the retention catch extends sufficiently from the exterior surface of the shaft to retain the coil compression spring between the handle and the retention catch.

2. The pop-pin of claim 1 wherein the fourth end of the first cylinder comprises external screw threads, and wherein the third end of the second cylinder comprises internal screw threads and the first cylinder and the second cylinder are configured for threaded engagement.

3. The pop-pin of claim 1 wherein the fourth end of the first cylinder comprises the retention catch.

4. The pop-pin of claim 3 wherein the retention catch comprises a shoulder formed by the coupling of the first and second cylinders and defined by the difference in diameters of the first and second cylinders.

5. The pop-pin of claim 3 wherein the handle is a spheroid.

6. The pop-pin of claim 5 further comprising a washer comprising: a first surface having a first hole; a second surface having a second hole; and a channel from the first hole to the second hole; wherein the second cylinder is disposed through the channel such that the first end of the first cylinder and the coil compression spring capture the washer.

7. The pop-pin of claim 3 wherein the handle comprises a T-bar.

8. The pop-pin of claim 3 wherein the handle comprises a planar element.

* * * * *